(12) United States Patent
Cho et al.

(10) Patent No.: US 12,496,917 B2
(45) Date of Patent: Dec. 16, 2025

(54) METHOD AND APPARATUS FOR VEHICLE LOCATION-BASED POWER CONTROL OF WIRELESS CHARGING INVERTER

(71) Applicants: KAIST (Korea Advanced Institute of Science and Technology), Daejeon (KR); WiPowerOne.Inc, Daejeon (KR)

(72) Inventors: Dong-Ho Cho, Daejeon (KR); Yong-Joon Song, Daejeon (KR); Yu-Jin Sim, Daejeon (KR); Hyo-Min Kim, Daejeon (KR); Je-Woo Kim, Daejeon (KR); Kyung-Hun Lee, Daejeon (KR); Gu-Ho Jung, Daejeon (KR); Bo-Yune Song, Daejeon (KR); Uoo-Yeol Yoon, Daejeon (KR)

(73) Assignees: KAIST (KOREA ADVANCED INSTITUTE OF SCIENCE AND TECHNOLOGY), Daejeon (KR); WIPOWERONE.INC, Daejeon (KR)

( * ) Notice: Subject to any disclaimer, the term of this patent is extended or adjusted under 35 U.S.C. 154(b) by 832 days.

(21) Appl. No.: 17/750,557

(22) Filed: May 23, 2022

(65) Prior Publication Data
US 2022/0281329 A1    Sep. 8, 2022

Related U.S. Application Data

(63) Continuation of application No. PCT/KR2020/016208, filed on Nov. 11, 2020.

(30) Foreign Application Priority Data

Nov. 21, 2019 (KR) .......................... 10-2019-0150391

(51) Int. Cl.
| | | |
|---|---|---|
| *B60L 53/122* | (2019.01) | |
| *B60L 53/30* | (2019.01) | |
| *H02J 50/10* | (2016.01) | |
| *H02J 50/80* | (2016.01) | |
| *H02J 50/90* | (2016.01) | |

(52) U.S. Cl.
CPC ............. *B60L 53/122* (2019.02); *B60L 53/32* (2019.02); *H02J 50/10* (2016.02); *H02J 50/80* (2016.02); *H02J 50/90* (2016.02)

(58) Field of Classification Search
CPC ........ B60L 53/122; B60L 53/32; H02J 50/10; H02J 50/80; H02J 50/90
See application file for complete search history.

(56) References Cited

U.S. PATENT DOCUMENTS

2002/0198736 A1* 12/2002 Harrison ................ G06Q 50/16
                                                            705/51
2013/0241535 A1*  9/2013 Magnussen ............ G01R 31/66
                                                            324/126

(Continued)

*Primary Examiner* — Seth A Silverman
(74) *Attorney, Agent, or Firm* — LEX IP MEISTER, PLLC (57) ABSTRACT

A power control of a wireless charging inverter is provided. Communication is performed between a driving vehicle and an inverter used for wireless charging of a vehicle. Using the location information of the driving vehicle, the time for the driving vehicle to enter the power supply line and the expected time to leave the power supply line are predicted. The power of the inverter is controlled by using the predicted enter and exit time information of the driving vehicle.

14 Claims, 9 Drawing Sheets

(56) References Cited

U.S. PATENT DOCUMENTS

2016/0036917 A1* 2/2016 Koravadi ................ B60L 53/12
    701/2
2018/0099643 A1* 4/2018 Golsch .................. G01S 13/765
2018/0307226 A1* 10/2018 Chase .................. G05D 1/0027

* cited by examiner

Calculation result of arrival and exit time (IN, OUT) for class of inverter

| State<br>Vehicle | Class 1<br>ON | Class 2<br>ON | .... | Request |
|---|---|---|---|---|
| 1 | -, - | 0, 0.5 | ... | ON |
| 2 | 0.5, 1 | 1, 5.2 | ... | ON |
| 3 | 5, 6 | 6, 7 | ... | OFF |
| ... | | | | |
| M | 30, 32 | 32, 34 | ... | SKIP |

FIG. 9

Calculation process of arrival and exit time for Class 2

| Time | 0~0.5 | 1.5~2 | 6~7 | 32~34 | .... |
|---|---|---|---|---|---|
| Request | ON | ON | OFF | SKIP | 1 |
| Time | -0.2~0.7 | 0.7~1.3 | 1.3~2.2 | 2.2~5 | 5~8 |
| Initial | ON | OFF | ON | OFF | OFF |
| Time | -0.2~0.7 | 0.7~1.3 | 1.3~2.2 | 2.2~5 | 5~8 |
| Merged | ON | | | OFF | |

Here, $t_{ON}=0.2$, $t_{OFF}=0.2$, $t_{margin}=0.8$, $t_{danger}=1$

METHOD AND APPARATUS FOR VEHICLE LOCATION-BASED POWER CONTROL OF WIRELESS CHARGING INVERTER

BACKGROUND OF THE INVENTION

1. Field of the Invention

The present invention relates to a power control of a wireless charging inverter, and more specifically, relates to a vehicle location-based power control method of a wireless charging inverter, in which method communication is performed between a vehicle and an inverter used for wireless charging of the vehicle, and estimated times of entry and exit of the vehicle to/from a power supply line are predicted using the vehicle's location information to control the power of the inverter.

2. Description of the Related Art

As electric vehicle technology evolves and electric vehicle demand increases, various charging technologies are being developed. In particular, research on a wireless charging technology that receives a magnetic field generated from a power supply device on the road and converts it into electric power energy in a power collector under the vehicle is being actively conducted. By using such wireless charging technology, it is possible to develop a wireless charging system while driving in which the vehicle is charged when passing over a power supply line without the need to park or stop for charging. In the wireless charging system while driving, an inverter power control technology is needed that discriminates the vehicle to be charged from the vehicle not to be charged, turns on the power only when the vehicle to be charged passes, and turns off the power when there is no wireless charging vehicle on the power supply line. In the existing system, an RFID reader is attached to the vehicle to recognize tags embedded in the road when entering the power supply line. However, such system using the embedded tags has disadvantages in that the recognition rate is lowered when the vehicle enters at high speed, and an additional sensor must be embedded in the road.

Therefore, in order to solve this disadvantage, an algorithm for predicting the time of vehicle entry and exit without installing an additional device on the road is required. In addition, communication between the inverter and the vehicle is required to determine when the vehicle enters and exits and whether a charging service is desired or not.

SUMMARY OF THE INVENTION

The present invention has been devised to solve such problems, and an object of the present invention is to provide a method for controlling the power of a wireless charging inverter based on vehicle location information in which method communication is performed between a vehicle and an inverter used for wireless charging of the vehicle, and estimated times of entry and exit of the vehicle to/from a power supply line are predicted using the vehicle's location information to control the power of the inverter.

In order to achieve the above object, there is provided a method for vehicle location-based power control of a wireless charging inverter, comprising the steps of: (a) receiving GPS coordinates from a currently driving vehicle registered in wireless charging service; and (b) determining a power control plan to provide to a segment based on the GPS coordinates of the currently driving vehicle received in step (a).

According to other aspect of the present invention, there is provided a method of vehicle location-based power control of a wireless charging inverter, comprising the steps of: (a) transmitting, by a vehicle, GPS coordinates to one or more inverters; (b) receiving, by the one or more inverters, the GPS coordinates transmitted in the step (a); and (c) establishing, by the one or more inverters, a power control plan of a segment based on the GPS coordinates received in the step (b).

According to another aspect of the present invention, there is provided an apparatus for vehicle location-based power control of a wireless charging inverter, comprising: a communication unit for receiving GPS coordinates from the vehicle; and a control unit for controlling power provided to a segment based on the GPS coordinates received from the communication unit.

According to the present invention, communication is possible even when driving at a high speed by using the location information of the vehicle, and there is an effect of receiving simple wireless charging based on vehicle location information without an additional sensor embedded on the road.

Moreover, the present invention has an effect to support efficient charging of the vehicle while driving through the analysis of vehicle location information and to solve EMI and EMF problems.

In addition, through communication with the inverter, the present invention makes it possible to select and charge only the vehicles that want to receive the service.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

Figure 1:
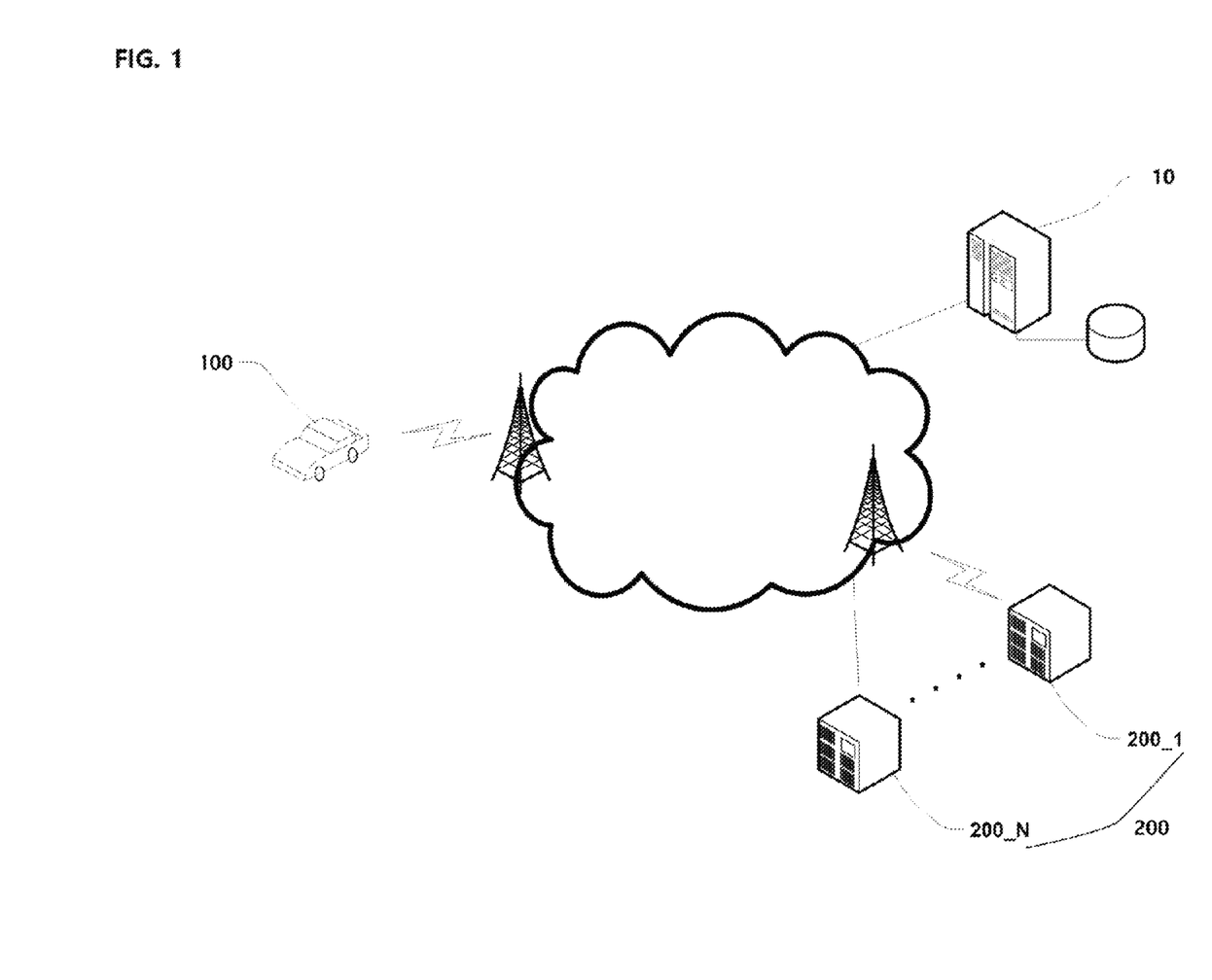
FIG. 1 is a diagram showing a simplified configuration of a vehicle location-based power control system of a wireless charging inverter according to the present invention.
Figure 2:
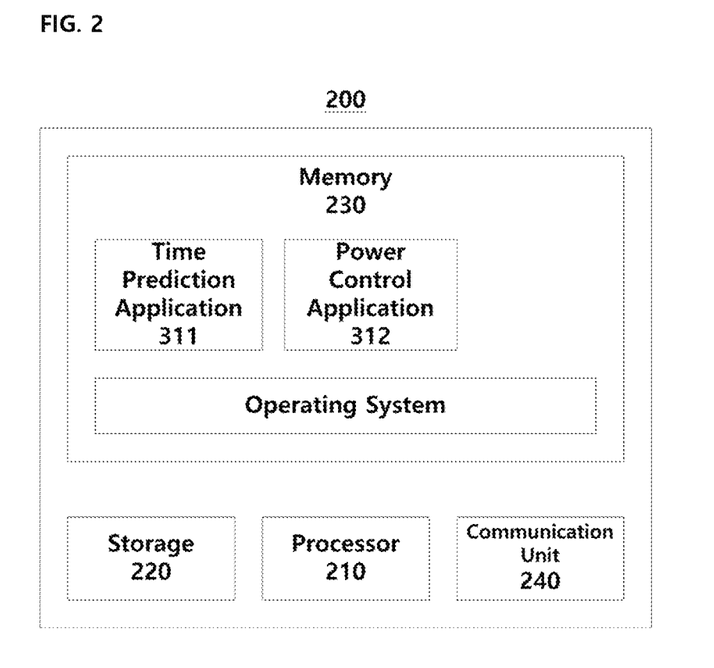
FIG. 2 is a block diagram showing the configuration of the inverter according to FIG. 1.

FIG. 1 is a diagram showing a simplified configuration of a vehicle location-based power control system of a wireless charging inverter according to the present invention, and FIG. 2 is a block diagram illustrating the configuration of the inverter according to FIG. 1.

As shown in FIG. 1, the vehicle location-based power control system of the wireless charging inverter according to the present invention includes a wireless charging operation server 10, a vehicle 100, and a plurality of inverters 1 . . . N 200. The vehicle 100 is wirelessly connected to the wireless charging operation server 10 through the Internet, and a plurality of inverters 1 . . . N 200 are capable of wired or wireless communication. The vehicle 100 and a plurality of inverters 1 . . . N 200 perform a registration procedure for wireless charging at the wireless charging operation server 10.

The vehicle 100 is equipped with a terminal for wireless charging, and performs a registration procedure for wireless charging through this terminal. The terminal mounted on the vehicle may be a general computer device or an Android device such as a smartphone. The vehicle 100 knows its ID in advance as a registration procedure for wireless charging is performed through the mounted terminal. In addition, the terminal mounted on the vehicle 100 downloads and secures the GPS coordinates of the locations of a plurality of inverters 1 . . . N 200 from the wireless charging operation server 10, and IDs, which may be a phone number, of a plurality of inverters 1 . . . N 200 are also provided therewith.

Each inverter 1 . . . N 200 includes, as shown in FIG. 2, a processor 210, a non-volatile storage unit 220 for storing programs and data, a volatile memory 230 for storing programs being executed, a communication unit 240 for performing communication with other devices, a bus serving as an internal communication path between these units. Running programs may include a device driver, an operating system, and various applications. In the present invention, a time prediction application 311 and a power control application 312 are executed. Each application 311, 312 may be operated in each computer device. For example, the time prediction application 311 may be operated in an Android device and the power control application may be operated in a single board computer (SBC). Although not shown, the general computer device includes a power supply unit such as a battery.

Figure 3:
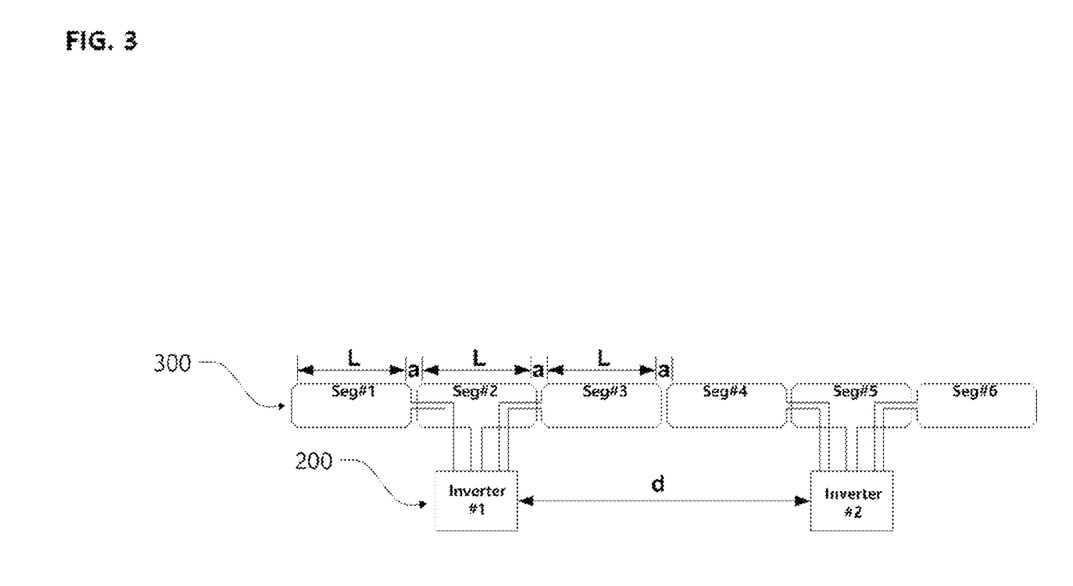
FIG. 3 is a conceptual diagram illustrating a structure of a segment as an embodiment of a power supply device including the inverter according to FIG. 1.

FIG. 3 is a conceptual diagram illustrating a structure of a segment as a power supply device including an inverter according to FIG. 1 as an embodiment. However, the present invention is not limited thereto, and various structures can be designed.

As shown in FIG. 3, the segments are arranged on the road, and the power supply device includes a segment-type power supply pad 300 and a plurality of inverters 1 . . . N 200 supplying AC power to at least one segment among a plurality of segments constituting the power supply pad 300. And although not shown, there are M types of switches capable of controlling N segments in the plurality of inverters 1 . . . N 200. In FIG. 3, there are three segments per one inverter. For example, Inverter #1 had switches for on-off (Seg #1), (Seg #2), (Seg #3), (Seg #1, Seg #2), (Seg #2, Seg #3) and (Seg #1, Seg #2, Seg #3). And, L can be designed to be 10 meters, a 0.55 meters, and d about 30 meters. Here, the power loss in each segment is line loss and air loss. Line loss is loss due to the high-voltage current flowing along the segment by the inverter, and air loss is a loss of power that is not transferred to the pick-up pad located under the vehicle during the wireless charging. Here, the measured efficiency is 98-99%, and the line loss proportional to the amount of power transmitted to the vehicle is dominant. Therefore, the focus is on maximizing the charging time of the vehicle rather than minimizing the line loss.

Figure 4:
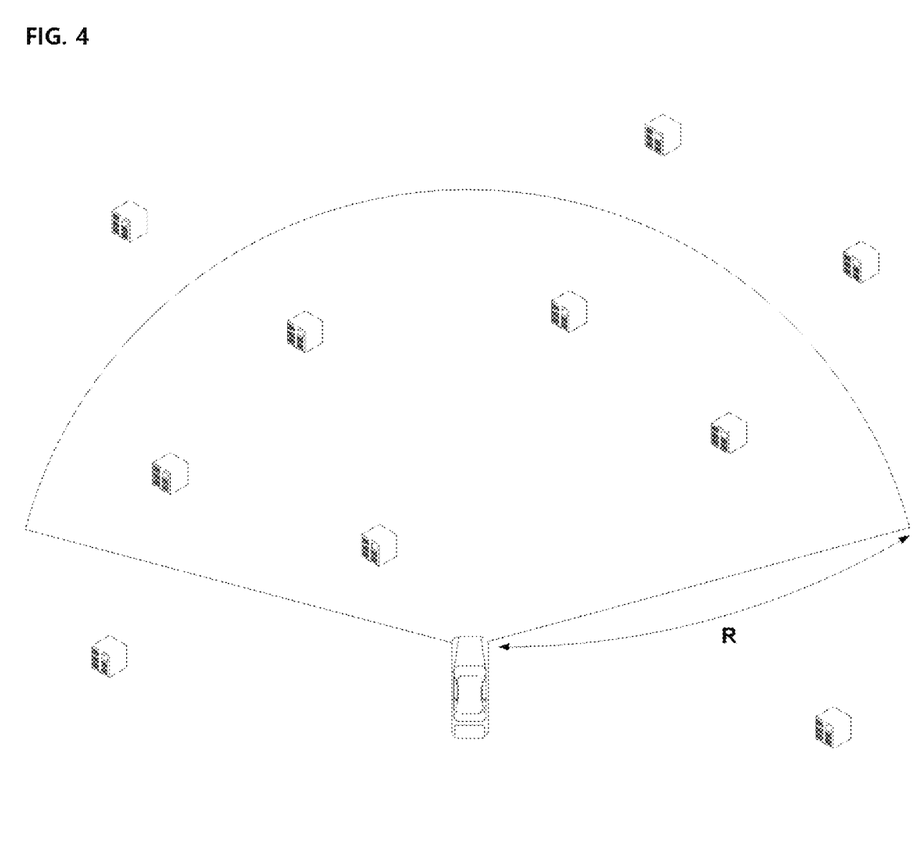
FIG. 4 is a view for explaining a communication configuration between the vehicle and a plurality of inverters according to FIG. 1.

FIG. 4 is a diagram for explaining a communication configuration between a vehicle and a plurality of inverters according to FIG. 1, wherein the vehicle and a plurality of inverters (indicated by a plurality of boxes) may use a communication method based on a wireless charging operation server or D2D (Device-to-Device). Here, for example, in the case of the D2D communication method, multicasting may be possible with inverters located at an arbitrary radial angle or within R km in a circle. R km may be 2 km.

Figure 5:
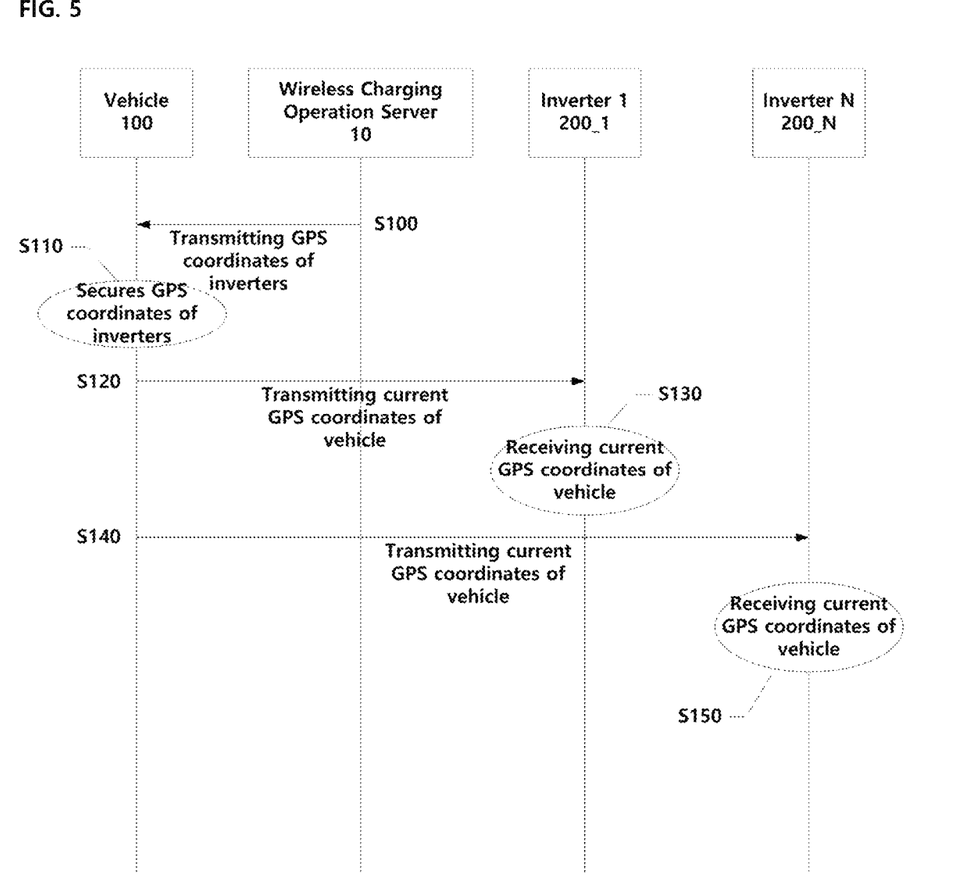
FIG. 5 is a flowchart illustrating a communication process between the vehicle and the inverter in the vehicle location-based power control method of the wireless charging inverter according to the present invention.
Figure 6:
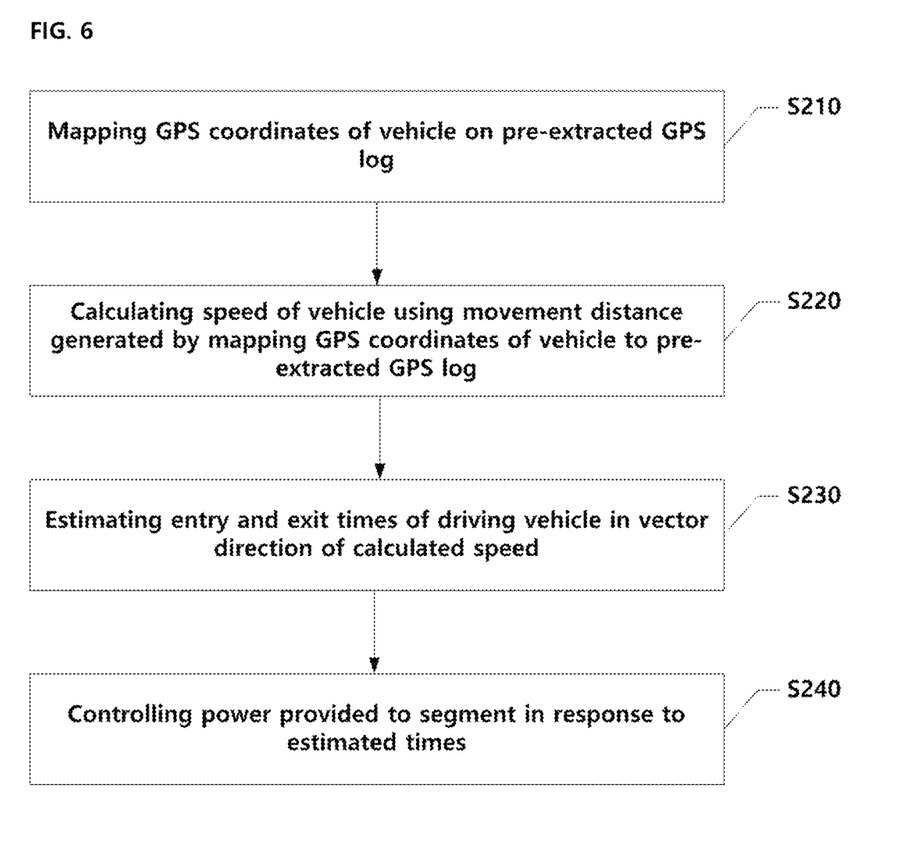
FIG. 6 is a flowchart illustrating a control process of the inverter in the vehicle location-based power control method of the wireless charging inverter according to the present invention.

FIG. 5 is a flowchart illustrating a communication process between a vehicle and an inverter in the vehicle location-based power control method of the wireless charging inverter according to the present invention, and FIG. 6 is a flowchart of a control method of an inverter in the vehicle location-based power control method of the wireless charging inverter according to the present invention.

First, the terminal mounted on the vehicle 100 and a plurality of inverters 1 . . . N 200_1 . . . 200_N perform a registration procedure for wireless charging through the wireless charging operation server 10. Thereafter, communication between the vehicle 100 and the plurality of inverters 1 . . . N 200_1 . . . 200_N may be made based on a wireless charging operation server or D2D (Device to Device) method. For example, an SMS method may be used. In the D2D method, the vehicle may communicate with inverters located within R km, but is not limited thereto.

The wireless charging operation server 10 transmits the GPS coordinates and IDs of a plurality of inverters 1 . . . N 200_1 . . . 200_N to the terminal mounted on the vehicle 100 (S100). The ID may be a phone number.

Thereafter, the vehicle 100 secures the GPS coordinates and IDs of the plurality of inverters 1 . . . N 200_1 . . . 200_N from the wireless charging operation server 10 (S110).

And the vehicle 100 transmits its current GPS coordinates to a plurality of inverters 1 . . . N 200_1 . . . 200_N based on the wireless charging operation server 10 or using a direct multicast communication method. (S120, S140).

Thereafter, the plurality of inverters 1 . . . N 200_1 . . . 200_N receives the current GPS coordinates of the vehicle transmitted in step S120 (S130, S150). At this time, the inverter determines a power control plan to be provided to the segment based on the received current GPS coordinates of the vehicle, and controls the power to be provided to the segment in response to the determined power control plan.

Thereafter, the process of determining the power control plan performed in the inverter and power control are performed as shown in FIG. 6.

Inverters 1 . . . N 200_1 . . . 200_N map the GPS coordinates of the vehicle received in steps S130 and S150 of FIG. 5 on the pre-extracted GPS log (S210).

At this time, the pre-extracted GPS log is information on a path that the vehicle can move on the road, and it is a GPS coordinates of a vehicle driving in the lane where the inverter exists when the inverter is initially installed. That is, in the present invention, a part of GPS path coordinate information obtained by a driving vehicle in a lane in which an inverter exists is extracted and used to predict the time of entry and exit into a segment for wireless charging of the vehicle 100. In addition, the mapping of the GPS coordinates of the driving vehicle to the GPS log will be described with reference to the drawing shown in FIG. 7.

Figure 7:
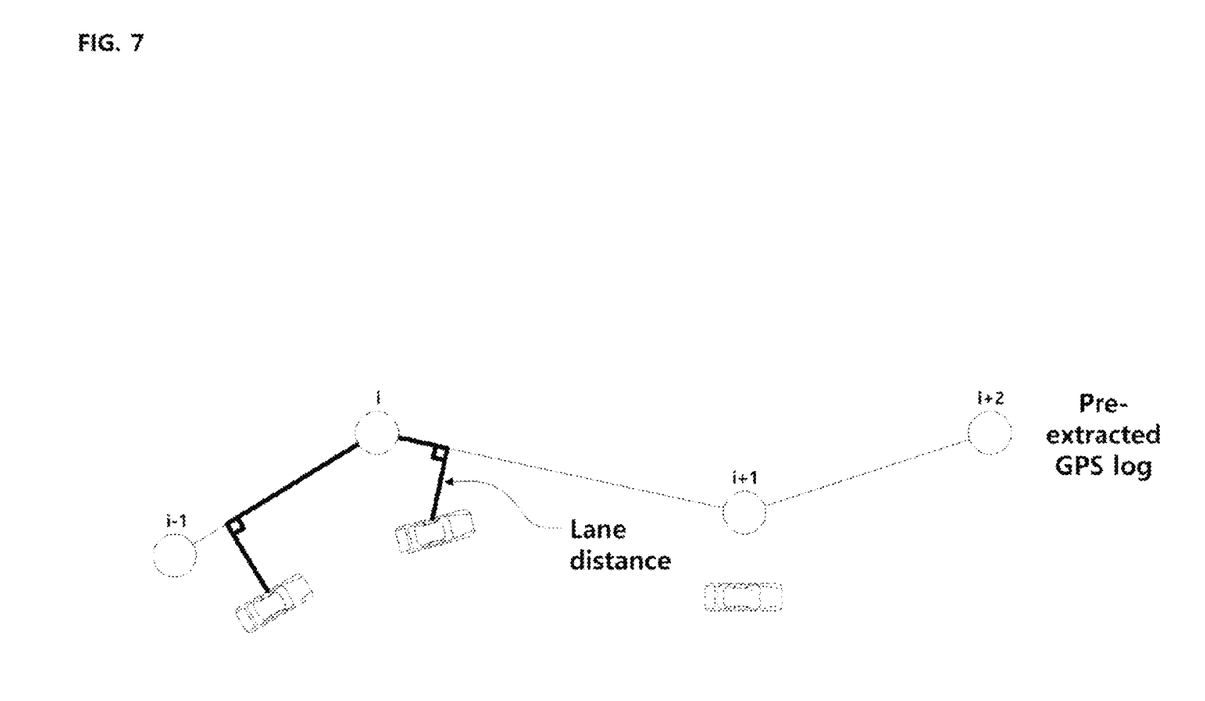
FIG. 7 is a diagram for explaining mapping of GPS coordinates of a vehicle to a pre-extracted GPS log during the control process of the inverter according to FIG. 6.

First, vertical line(s) are drawn down for the paths between the ith point and the i+1th point in the GPS log. Among the vertical lines, the position of the nearest vertical line or point is determined as the position of the vehicle. Here, the distance between the nearest point and the point where the vertical line is drawn on the GPS log path may be determined as the lane distance, and lane information at the time of entry and exit can be predicted through the degree of change in the lane distance. If it deviates between two points among the vertical lines (a vehicle indicated by a dotted line), the position of the closest point among the two points is determined as the vehicle location.

Next, the speed is calculated using the movement distance (indicated by the thick solid line of the GPS log in FIG. 7) generated by mapping the GPS coordinates of the vehicle to the GPS log in step S121 (S220).

Then, the vehicle's entry and exit times are predicted in the inverter in the vector direction of the speed calculated in step S220 (S230). However, due to the nature of prediction, sufficient points are required to predict the current direction of the vehicle, so it is better to avoid installing an inverter near a location such as a tunnel or an intersection.

Thereafter, the power provided to the segment is controlled in response to the time predicted in step S230 (S240).

Without being limited to a specific communication process, an example of the time required in a series of processes from the vehicle to the control of the inverter is as follows: Assume that GPS measurement cycle is 1 second, SMS transmission is 0.7 seconds, application calculation time is 0.1 seconds, socket communication time is 0.1 seconds, control and I/O board processing time is 0.1 seconds, switch turn-on time is 0.1 seconds, and regulator control time is 0.1 seconds.

For an example of the required time as described above, an example of control by predicting the entry time is as follows: If the GPS measurement time is 1:00:00 and the remaining time from the GPS-based entry time prediction is 5.0 seconds, the estimated entry time is 1:00:05. According to the example of the above required time, since the application calculation completion time in SMS transmission is 1:00:01, and the time from socket communication to regulator control is 0.5 seconds, so that the power can be turned on after 3.5 seconds, which is the remaining time until power control.

Figure 8:
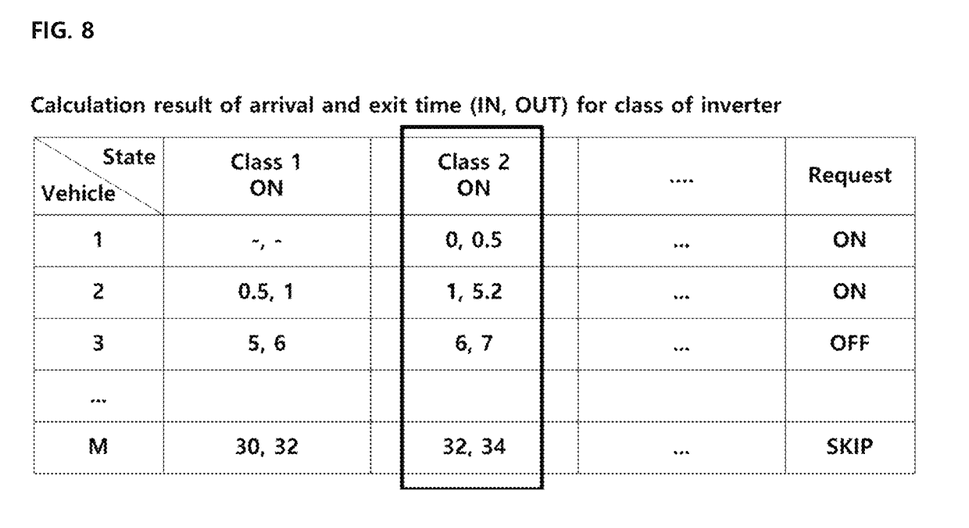
FIG. 8 is a view showing a time table calculation result of a power control application using a segment power insertion algorithm of the inverter according to the present invention.
Figure 9:
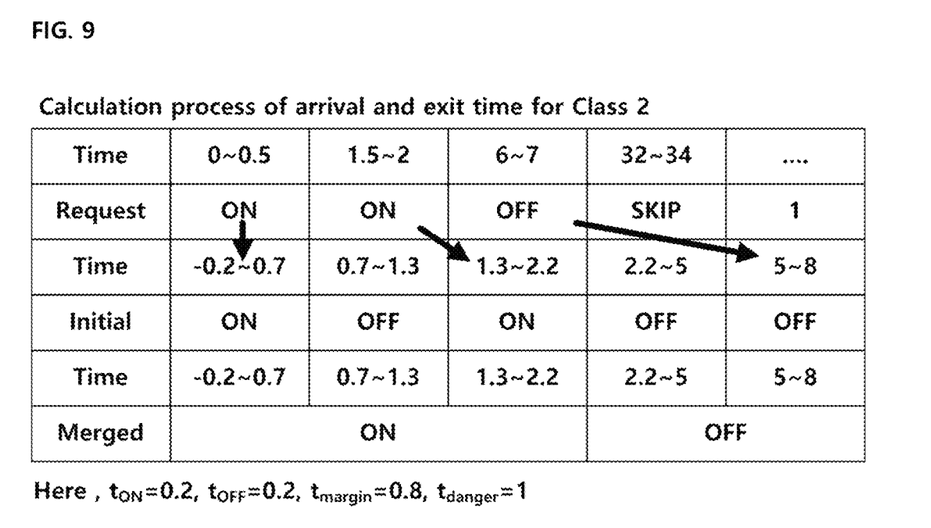
FIG. 9 is a view showing segment 2 of FIG. 8.

FIG. 8 is a diagram showing an application calculation result using the segment (class) power insertion algorithm of the inverter according to the present invention, and FIG. 9 is a diagram showing segment class 2 of FIG. 8.

In FIG. 9, $t_{ON}$ denotes a time when a segment is turned on, and $t_{OFF}$ denotes a time when a segment is turned off. All operations must be performed in advance in consideration of the segment's turn-on and turn-off times. And $t_{danger}$ is a time indicating a specific margin value when the segment is turned off. In this case, the segment is set to be unconditionally turned off. In addition, $t_{margin}$ is a value when several vehicles approach with a specific margin. In this case, the segment is set to be continuously turned on. In addition, time information can be obtained from the location information for each segment. It is also necessary to define the class of the power-on group in which segments are grouped. For example, three segments 1, 2, 3 can be each class (1), (2), (3), and also can be each group {(1)}, {(2)}, {(3)}. In another example, classes (1,2), (2,3), (1,2,3) can be scenarized into groups {(1,2), (2,3)}, {(1,2,3)}, in which case each segment can be determined as a group as well as a class. For each group, it is also necessary to set the conditions according to the time spent in the class constituting each group, the speed of the vehicle, and the number of cars on it. After selecting a group, ON and OFF times are determined by reflecting the requirements for each class.

Therefore, after determining the group and scenario for applying power to the inverter, ON and OFF are determined for each time period using the entry and exit times for each class. FIG. 8 shows a time table of entry (IN) and exit (OUT) times for each class as an application calculation result. FIG. 9 is a diagram for class 2 (indicated by a bold box) of FIG. 8. The request priority is OFF (danger signal), ON, and SKIP in the order. SKIP is a case when another vehicle is in another lane or the SOC level is sufficient.

As described above, although the present invention has been described with reference to limited embodiments and drawings, the present invention is not limited thereto, and the technical idea of the present invention and the following by those of ordinary skill in the art to which the present invention pertains. Of course, various modifications and variations are possible within the scope of equivalents of the claims to be described.

What is claimed is:

1. A method for vehicle location-based power control of a wireless charging inverter, comprising the steps of:
   (a) receiving GPS coordinates from a currently driving vehicle registered in wireless charging service; and
   (b) determining a power control plan to provide to a segment based on the GPS coordinates of the currently driving vehicle received in step (a),
   wherein the step (b) includes the steps of: (b1) generating a movement distance by mapping the GPS coordinates of the currently driving vehicle received in step (a) onto a pre-extracted GPS log; and (b2) calculating a speed of the currently driving vehicle using the movement distance generated in step (b1) and estimating entry and exit times of the currently driving vehicle in a vector direction of the calculated speed, and
   wherein the pre-extracted GPS log is a GPS coordinates recorded in advance while a vehicle drives in a lane where the inverter is present at a time of installation.

2. The method of claim 1, wherein the mapping in the step (b1) includes the steps of: (b11) drawing one or more vertical lines on paths between ith point and (i+1)th point of the pre-extracted GPS log; and (b12) determining a nearest point among the vertical lines drawn in step (b11) as a location of the currently driving vehicle.

3. The method of claim 2, wherein, if the vertical line drawn in step (b11) deviates from the paths between ith point and the (i+1)th, determining the nearest point among the two points as the location of the currently driving vehicle.

4. The method of claim 2, wherein a distance between the nearest point and the point where the vertical line is drawn on the path of the pre-extracted GPS log is a lane distance.

5. The method of claim 1, wherein the GPS coordinates are received at a constant interval or variable intervals.

6. The method of claim 1, further comprising a step of controlling power to be provided to the segment in response to the determined power control plan after step (b).

7. A method for vehicle location-based power control of a wireless charging inverter, comprising the steps of:
- (a) transmitting, by a vehicle, GPS coordinates to one or more inverters;
- (b) receiving, by the one or more inverters, the GPS coordinates transmitted in the step (a); and
- (c) establishing, by the one or more inverters, a power control plan of a segment based on the GPS coordinates received in the step (b),
- wherein the step (c) includes the steps of: (c1) generating a movement distance by mapping the GPS coordinates of the vehicle received in step (b) onto a pre-extracted GPS log; and (c2) calculating a speed of the vehicle using the movement distance generated in the step (c1) and estimating entry and exit times of the vehicle in a vector direction of the calculated speed, and
- wherein the pre-extracted GPS log is a GPS coordinates recorded in advance while a vehicle drives in a lane where the inverter is present at a time of installation.

8. The method of claim 7, wherein the transmission method in the step (a) is either a server-based or device-to-device approach.

9. The method of claim 7, wherein the mapping in the step (c1) includes the steps of: (c11) drawing one or more vertical lines on paths between ith point and (i+1)th point of the pre-extracted GPS log; and (c12) determining a nearest point among the vertical lines drawn in step (c1) as a location of the vehicle.

10. The method of claim 9, wherein, if the vertical line drawn in step (c11) deviates from the paths between ith point and the (i+1)th, determining the nearest point among the two points as the location of the currently driving vehicle.

11. The method of claim 9, wherein a distance between the nearest point and the point where the vertical line is drawn on the path of the pre-extracted GPS log is a lane distance.

12. The method of claim 7, wherein an interval for receiving the GPS coordinates of the vehicle is constant or variable.

13. The method of claim 7, further comprising a step of controlling power to be provided to the segment in response to the determined power control plan after the step (c).

14. An apparatus for vehicle location-based power control of a wireless charging inverter, comprising:
- a communication unit for receiving GPS coordinates from the vehicle; and
- a control unit for controlling power provided to a segment based on the GPS coordinates received from the communication unit,
- wherein the control unit generates a movement distance by mapping the received GPS coordinates of the vehicle onto a pre-extracted GPS log, calculates a speed of the vehicle using the generated movement distance, and estimates entry and exit times of the vehicle in a vector direction of the calculated speed, and
- wherein the pre-extracted GPS log is GPS coordinates recorded in advance while a vehicle drives in a lane where the inverter is present at a time of installation.

* * * * *